United States Patent [19]

Henke

[11] Patent Number: 4,881,519
[45] Date of Patent: Nov. 21, 1989

[54] HOT AIR OVEN HAVING INFRA-RED RADIANT SURFACES

[75] Inventor: Mitchell C. Henke, Fort Wayne, Ind.

[73] Assignee: Lincoln Foodservice Products, Inc., Fort Wayne, Ind.

[21] Appl. No.: 220,462

[22] Filed: Jul. 18, 1988

[51] Int. Cl.⁴ .......................... A21B 1/00; A23L 3/00
[52] U.S. Cl. ............................... 126/21 A; 126/39 D; 99/443 C; 99/477
[58] Field of Search .................... 126/21 A, 39 D; 99/443 C, 447, 401, 386; 432/10, 11, 148

[56] References Cited

U.S. PATENT DOCUMENTS

| | | |
|---|---|---|
| 784,854 | 3/1905 | Grace . |
| 1,458,021 | 6/1923 | Banford . |
| 3,721,178 | 3/1973 | Szabrak et al. . |
| 3,823,660 | 7/1974 | Nerthling . |
| 3,889,009 | 6/1975 | Lipoma . |
| 4,154,152 | 5/1979 | Lang-Ree et al. . |
| 4,252,055 | 2/1981 | Johansson et al. . |
| 4,363,955 | 12/1982 | Gauthier et al. . |
| 4,377,109 | 3/1983 | Brown et al. . |
| 4,438,572 | 3/1984 | Kaminski . |
| 4,462,383 | 7/1984 | Henke et al. . |
| 4,554,437 | 11/1985 | Wagner et al. . |
| 4,556,043 | 12/1985 | Bratton . |
| 4,591,333 | 5/1986 | Henke . |
| 4,626,661 | 12/1986 | Henke . |
| 4,679,542 | 7/1987 | Smith et al. . |
| 4,701,340 | 10/1987 | Bratton et al. . |
| 4,739,154 | 4/1988 | Bharara et al. . |
| 4,753,215 | 6/1988 | Kaminski et al. ................ 126/21 A |
| 4,781,169 | 11/1988 | Henke et al. ..................... 126/21 A |

Primary Examiner—Larry Jones
Attorney, Agent, or Firm—Albert L. Jeffers; John F. Hoffman; Richard L. Robinson

[57] ABSTRACT

A food preparation oven includes an enclosure defining a chamber for receiving a food product therein. A heater and a fan are provided for heating and recirculating the air within the chamber. A foraminous wire mesh conveyor loop passes through the chamber for supporting and transporting a food product in and through the chamber. A plate having an upper infra-red radiant emissive surface is disposed within the conveyor belt loop. A plurality of lower duct fingers located below the conveyor belt loop communicate with the outlet of the air recirculating fan and are configured for directing columnated jets of hot air upwardly through the lower loop portion of the conveyor belt loop such that the hot air impinges on the lower surface of the radiant plate. After heating the radiant plate the hot air passes around the edges thereof and enters a plurality of upper return duct fingers disposed above the coveyor belt loop. The upper return duct fingers area in communication with the inlet of the air recirculating fan. The upper return duct fingers include infra-red radiant emissive surfaces facing downwardly toward the upper loop portion of the conveyor belt loop, which radiant surfaces are heated by hot air entering the return finger ducts.

16 Claims, 4 Drawing Sheets

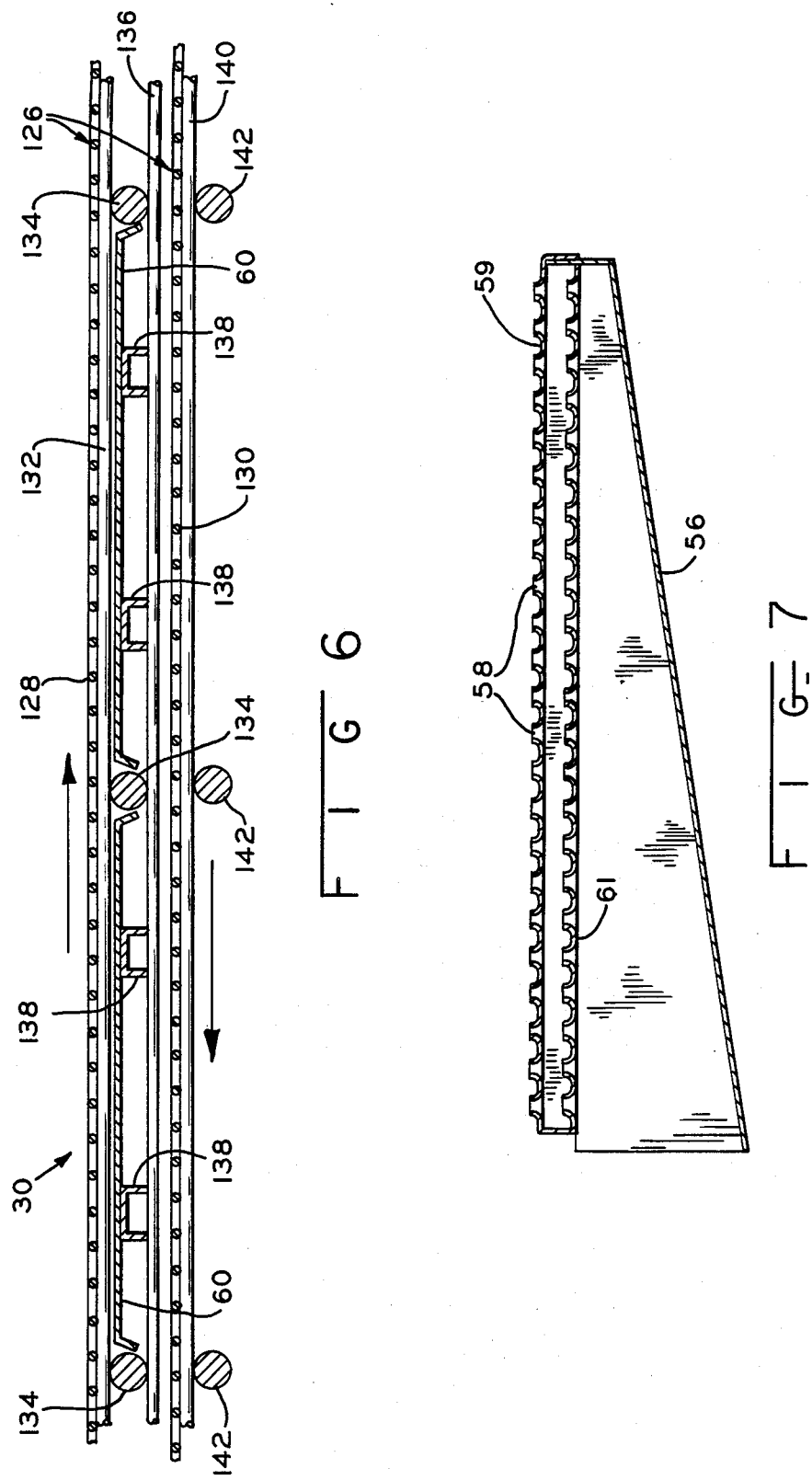

HOT AIR OVEN HAVING INFRA-RED RADIANT SURFACES

BACKGROUND OF THE INVENTION

The present invention relates generally to an oven for heating, cooking and baking food products and more particularly to a hot air type oven having cooking characteristics similar to those of a hearth type oven.

Certain conveyorized hot air ovens have been used successfully for a number of years to quickly cook food products, particularly pizza, within a relatively short travel path, on the order of three to five feet. A particularly advantageous arrangement for such conveyor ovens involves impingement cooking wherein standing columns of hot air are directed at localized areas of the moving food product to cook the food product and to carry away moisture and particles resulting from the cooking process. The above cooking process involves extremely efficient convection heating of the food product wherein the high velocity, highly turbulent columns of hot air impart a large amount of heat energy into the food product in a short amount of time. Depending on the dough mixture, such impingement heating of pizza dough may result in some "chalking" of the crust and a slight change of flavor as compared to a hearth oven baked pizza because the impingement energy sets up the exterior of the crust before thorough crust development can happen. In addition, it is difficult to make the crust "crisp" with convection or impingement heating.

A significant portion of the pizza market requires a pizza product having a crust which is crispy and a golden color on the bottom. Such a crust texture is characteristic of pizzas cooked in a traditional hearth type pizza oven in which the pizza is laid on a solid hot surface composed of a metallic or ceramic material. Contrary to what one might initially suppose, it is believed that the crispy bottom surface of pizza crust which is obtained in a hearth oven is not solely the result of conduction heating of the dough by the hot surface of the hearth. Although pizza dough in a hearth oven is in intimate contact with the hearth surface, a thin layer of water vapor formed during cooking acts as insulation and prevents total transfer of heat to the pizza dough via conduction. It is believed that the crispy nature of the bottom of the pizza crust cooked on a hearth is additionally the result of heating of the dough by infra-red radiation emitted from the hot hearth surface.

It would be desirable to provide a hot air type oven with its inherent speed and efficiency characteristics which would also cook pizza crust so as to have a crispy bottom surface in the nature of a hearth-baked pizza. An oven constructed in accordance with the present invention provides such desired characteristics.

U.S. Pat. No. 4,462,383 discloses an impingement oven for preparing foods wherein duct fingers are provided, with each finger having a jet plate through which hot air is vented outwardly in standing columns to impinge on food products located between the duct fingers in an oven cavity. The food travels on a conveyor belt between the duct fingers as it is being cooked. The oven incorporates a fan and plenum system whose high pressure side is connected to both upper and lower duct fingers whereby hot air impinges downwardly from the upper duct fingers and upwardly from the lower duct fingers simultaneously onto the respective sides of the food product. The fan recirculates the air within the oven cavity for reheating and subsequent passage through the plenum and duct fingers.

U.S. Pat. No. 4,626,661 discloses an air delivery system for an impingement food preparation oven wherein the fan blades and plenum are configured for smoother flow of heated air from the fan through the plenum.

U.S. Pat. No. 4,591,333 discloses an impingement oven which includes radiant panels positioned above the conveyor to impart heat to the food product by means of infra-red radiation. In one embodiment, the hot air apertures of conventional impingement duct fingers are covered by highly thermally conductive radiant energy plates upon which the hot air impinges, and which deflect the impinging air laterally and upwardly away from the food product. The plates include an emissive outer surface which when the panel becomes heated by impingement of hot air thereon, radiates infra-red energy toward the food product. In a second embodiment, the apertured radiant plate of the impingement finger is replaced by a solid emissive panel having corner apertures to permit pressurized air to escape the duct and be drawn back into the plenum.

U.S. Pat. Nos. 4,462,383, 4,626,661 and 4,591,333 are hereby incorporated by reference.

SUMMARY OF THE INVENTION

The present invention involves an oven suitable for cooking a food product, particularly pizza, carried through the oven on a moving conveyor belt. The food product is heated both from below and from above primarily by infra-red radiation emitted from radiant upper and lower plates. A fan and plenum assembly, with associated delivery and return ducts, recirculates hot air within the oven. Hot air from the high pressure side of the plenum assembly enters a duct finger located below the lower radiant plate and configured to cause hot air to be directed upwardly against the undersurface of the lower plate, thereby heating the plate and causing it to radiate infra-red energy upwardly to the undersurface of the food product. The hot air, after heating the lower plate, passes around the edges and back of the lower plate and into the upper return duct which is connected to the low pressure side of the plenum assembly. The upper return duct is fitted with an upper radiant plate which is heated by the return air passing into and through the duct, which upper plate radiates infra-red energy downwardly to the top surface of the food product.

The present invention alleviates the problem of chalking and flavor change of pizza crust which may result from convection or impingement heating of pizza dough and also produces a pizza crust which has the desired characteristics of crispness and golden color on the bottom. A pizza cooked in an oven according to the present invention obtains flavor and texture characteristics which heretofore were provided only by hearth type ovens. Yet the cooking process is quicker and more fully regulated due to the conveyorized operation.

According to one aspect of the present invention, the lower radiant plate is located within a foraminous conveyor belt loop, that is, the lower radiant plate is located below the upper loop portion of the conveyor belt loop which supports the food product and is located above the lower return loop portion of the conveyor belt loop so that the lower radiant plate can be located as closely as possible to the undersurface of the food product. Hot air from the lower duct finger is directed by apertured plates into columnated jets which pass through the foraminous lower loop portion of the conveyor belt loop and impinge upon the undersurface of the lower radiant plate. The hot air then passes around the sides and rear end of the lower radiant plate and enters the upper duct finger where a system of apertures and baffles promotes additional heat transfer from the hot air to the upper radiant plate which then radiates heat downwardly onto the food product. Consequently, the present invention takes advantage of recirculating air as a medium for transferring heat from a heat source to remote radiant plates yet avoids the disadvantages which may be associated with heating a food product directly by conventional convection heating or hot air impingement heating.

One aspect of the present invention involves a food preparation oven including an enclosure defining a chamber for receiving food product therein. Support means for supporting a food product is disposed in said chamber and air recirculating means including an inlet are provided for recirculating a mass of air within the chamber. Heating means are provided for heating air within the chamber. A return duct in flow communication with the inlet of the recirculating means includes a wall having an outer radiant energy emissive surface means for radiating infra-red energy towards the support means when the wall is heated. The return duct further includes means for heating the wall by communicating heated air from the chamber into the return duct.

Another aspect of the present invention involves a food preparation oven including an enclosure defining a chamber for receiving food product therein and support means for supporting a food product in the chamber with the support means being at least partially transparent to infra-red radiation. Air recirculating means including an inlet and an outlet are provided for recirculating a mass of air within the chamber and heating means are provided for heating air within the chamber. A plate is supported in the chamber adjacent and below the support means with the plate having an upper radiant energy emissive surface means for radiating infra-red energy toward the support means when the plate is heated. Further provided is a heating means for heating the plate. The heating means includes an outlet duct disposed below the plate in flow communication with the output of the air recirculating means. The outlet duct further includes means for directing heated air against the plate.

It is an object of the present invention to provide an improved recirculating hot air type oven in which the food product is cooked primarily by infra-red radiation.

Further objects and advantages of the present invention will become apparent from the following description.

BRIEF DESCRIPTION OF THE DRAWINGS

The above mentioned and other features and objects of the invention and the manner of obtaining them will become more apparent and the invention itself will be better understood by reference to the following description of an embodiment of the invention taken in conjunction with the accompanying drawings wherein:

FIG. 6 is an enlarged fragmentary sectional view of a conveyor and associated radiant panel of the oven of FIG. 1

FIG. 7 is a sectional view of a lower duct finger of the oven of FIG. 1.

DETAILED DESCRIPTION OF A PREFERRED EMBODIMENT

Figure 1:
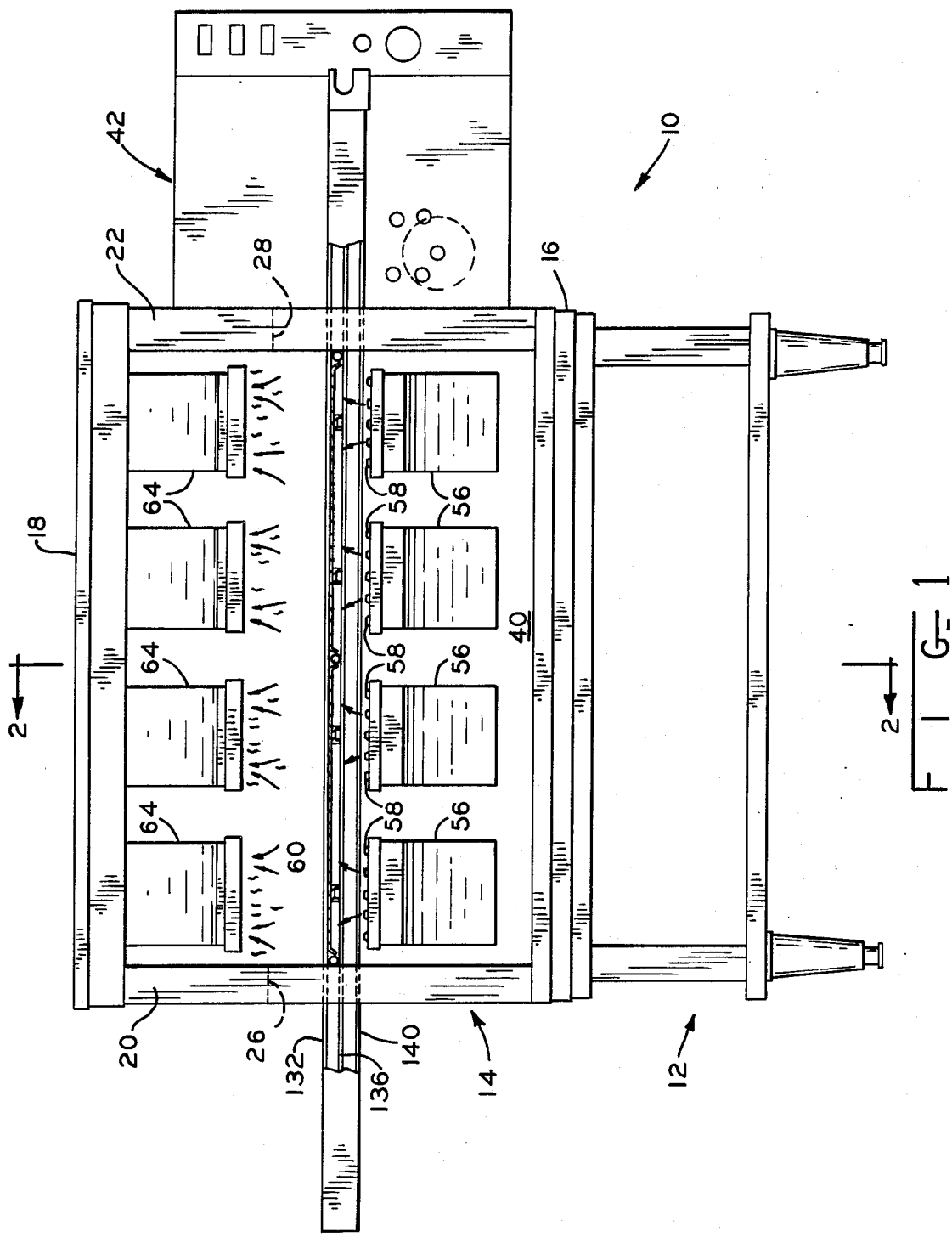
FIG. 1 is a side elevational, partly sectional view of an oven according to the present invention.
Figure 2:
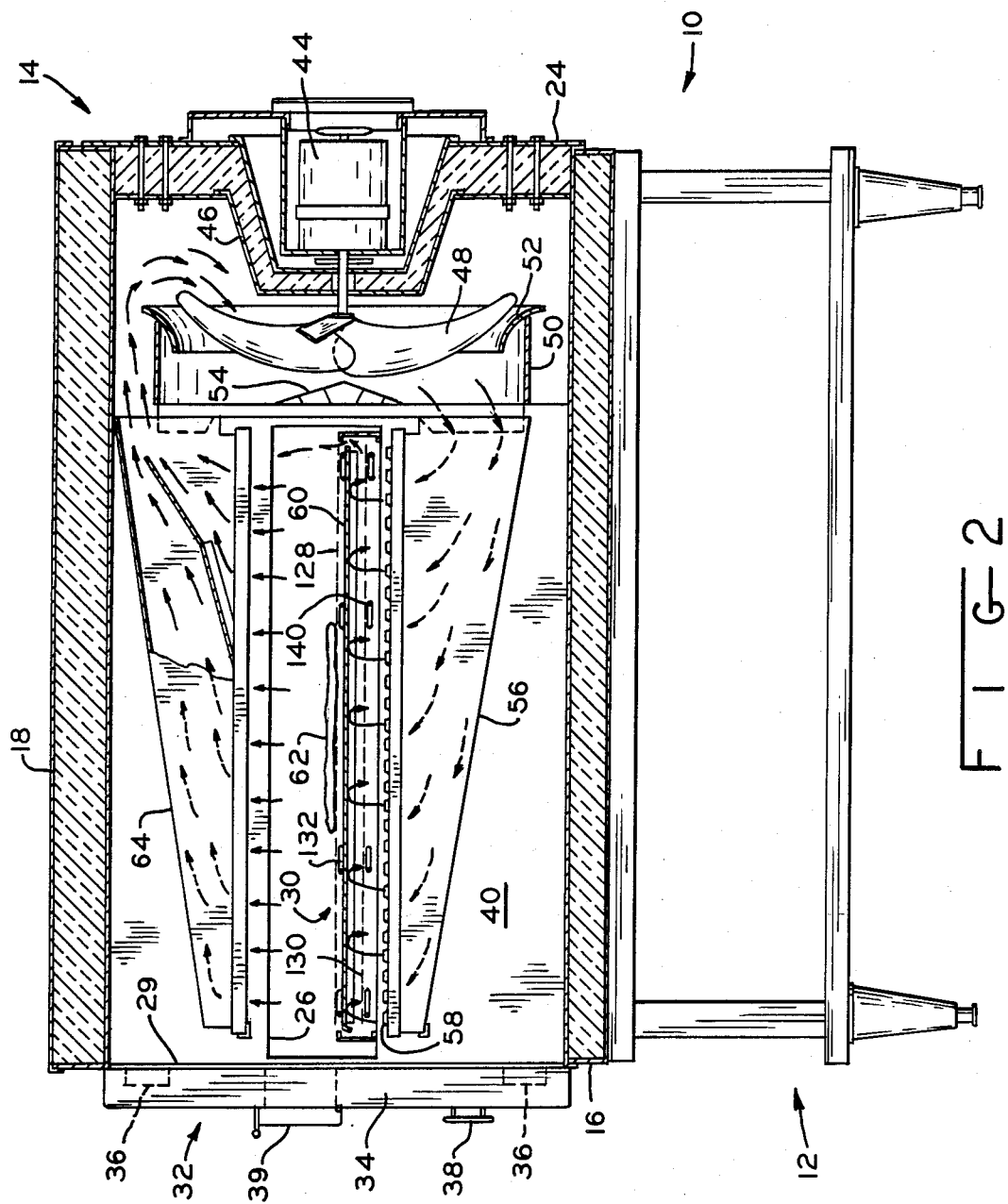
FIG. 2 is a sectional view of the oven of FIG. 1 taken along line 2—2 of FIG. 1 and viewed in the direction of the arrows wherein portions ave been broken away to better illustrate the structure.

Referring to FIGS. 1 and 2, oven 10 is shown including a four legged stand assembly 12 and cabinet assembly 14. The entire stand assembly 12 is preferably constructed of stainless steel for durability and cleanability.

Cabinet assembly 14 includes bottom panel 16, top panel 18, side panels 20 and 22, rear panel 24 and a front wall 29. Each of panels 16-24 are preferably constructed of a stainless steel shell, within which a core of insulation is disposed. Front wall 29 is also made of stainless steel. Side panels 20 and 22 include rectangular openings 26 and 28, respectively, through which a conveyor assembly 30 extends.

A door assembly 32 (FIG. 2) is provided which includes an insulated core stainless steel door panel 34 which is hingedly connected to cabinet assembly 14 by means of hinges 36 and which can be swung open and closed by handle 38. Door panel 34 is provided with a hinged access door 39 to provide for the inspection or manipulation of food products on conveyor assembly 30 within cabinet assembly 14 without requiring the opening of the larger door panel 34.

Cabinet assembly 14 provides a food preparation enclosure defining a chamber 40 for receiving food products therein, which chamber except for rectangular openings 26 and 28 is essentially closed. Air within chamber 40 is heated by a heat source 42 which includes a gas burner supplied by conventional gas supply means (not shown) and blower means (not shown) for supplying gas and air to the burner for proper combustion. Heat is generated by a flame in the customary fashion. While a gas fueled heating source is described, it should be understood that an electric heat source could also be used.

Recirculation of heated air within chamber 40 is provided by an electric motor 44 mounted within a frustoconical shaped shroud portion 46 of rear panel 24. Motor 44 rotates fan 48 mounted within a plenum 50 including an aerodynamically curved intake ring shroud 52 and an air deflector 54 located centrally in front of fan 48 on the front wall of plenum 50.

As in the aforementioned patents, a plurality of lower duct fingers 56 are mounted to plenum 50 below conveyor assembly 30 in flow communication with the high pressure side of plenum 50. As shown by the arrows in FIG. 2, heated air from plenum 50 flows into lower duct fingers 56 and upwardly out therefrom through a plurality of nozzles 58. Nozzles 58 are designed to direct jets of columnated air upwardly toward conveyor assembly 30. To provide the columnated jets of air, duct fingers 56 include an outer nozzle plate 59 having a plurality of apertures therethrough and a corresponding inner nozzle plate 61 spaced apart therefrom and having a like number of apertures aligned with the apertures of the outer nozzle plate. Reference is made to U.S. Pat. No. 4,626,661 for further description of the lower impingement duct fingers 56.

Contrary to prior impingement type ovens wherein the lower duct fingers provide for impingement of columnated hot air directly upon the bottom surface of the food product supported by the conveyor, the preferred embodiment of the present invention involves a plate 60 which is disposed within the conveyor assembly 30 intermediate the lower duct finger 56 and the food product 62 which is supported by the upper surface of conveyor assembly 30. Plate 60 is a substantially contiguous, highly thermally conductive aluminum sheet having a thickness in the range of 0.080 to 0.250 inches and covers substantially the full length and width of the cooking area of conveyor assembly 30. Consequently the columnated jets of hot air which are directed upwardly from lower duct fingers 56 impinge on the undersurface of plate 60 rather than upon the food product 62. Plate 60 is hard coat anodized on the undersurface and upper surface thereof, resulting in a black surface capable of efficient collection and emission of infra-red radiation. The anodized finish can consist of sulfuric anodized type III hard coat, alternatively, the plate 60 can be made of a semi-thermally conductive material with high radiative characteristics, such as the commercially available material TRANSITE, which is capable of efficient collection and emission of infra-red radiation. The emissivity of the coating is such that with columnated jets of hot air at a temperature of about 575° F. heating the undersurface of plate 60, heat is conducted to the upper surface of plate 60 and radiated as infra-red energy at an effective infra-red temperature of 750° F. toward and through the upper food support portion of conveyor assembly 30, thereby heating the lower surface of food product 62. Hot air from lower duct fingers 56, after having heated plate 60, passes around the sides and rear edge of plate 60 where it is drawn into the low pressure inlet side of plenum 50 via upper return duct fingers 64.

The aforementioned air flow pathway is different from prior impingement type ovens in that the upper duct fingers 64 are not in flow communication with the high pressure side of plenum 50 but rather are closed off to plenum 50 at the point of mounting thereto. The upper rear portion of duct fingers 64 is open, permitting air flow over and around plenum 50 toward the low pressure intake side thereof, as shown by the arrows in FIG. 2. Furthermore, because of contiguous plate 60, hot air flowing out of lower duct fingers 56 does not flow upwardly through the upper food support portion of conveyor assembly 30 but rather is bypassed around the sides and rear edges of plate 60, thereby substantially reducing convection heating of food product 62.

Figure 3:
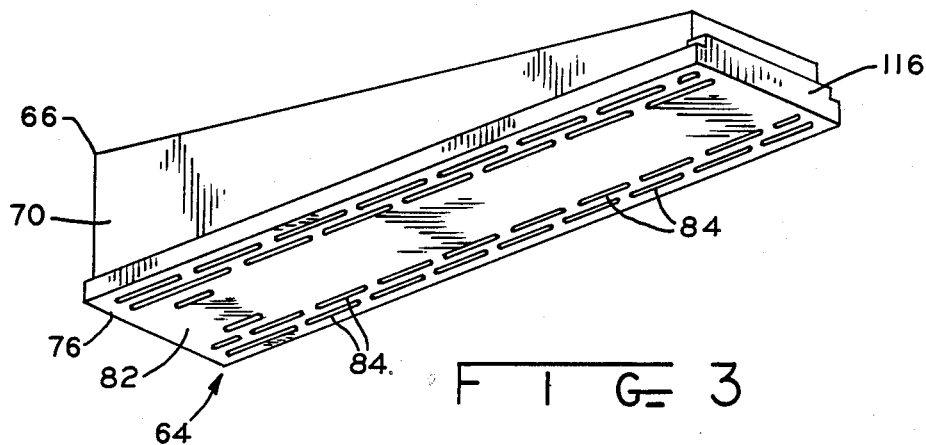
FIG. 3 is a perspective view of a duct finger and radiant panel of the oven of FIG. 1.
Figure 4:
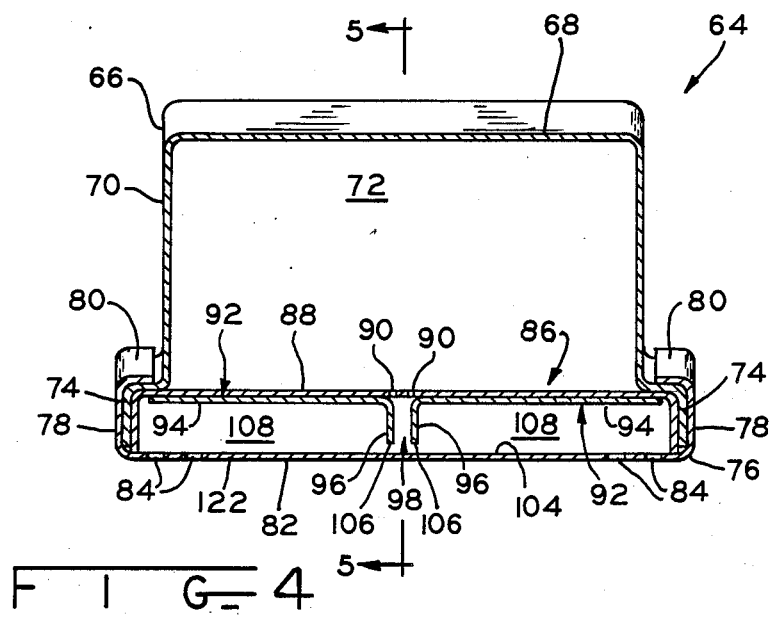
FIG. 4 is a transverse sectional view of the duct finger and radiant panel of FIG. 3.
Figure 5:
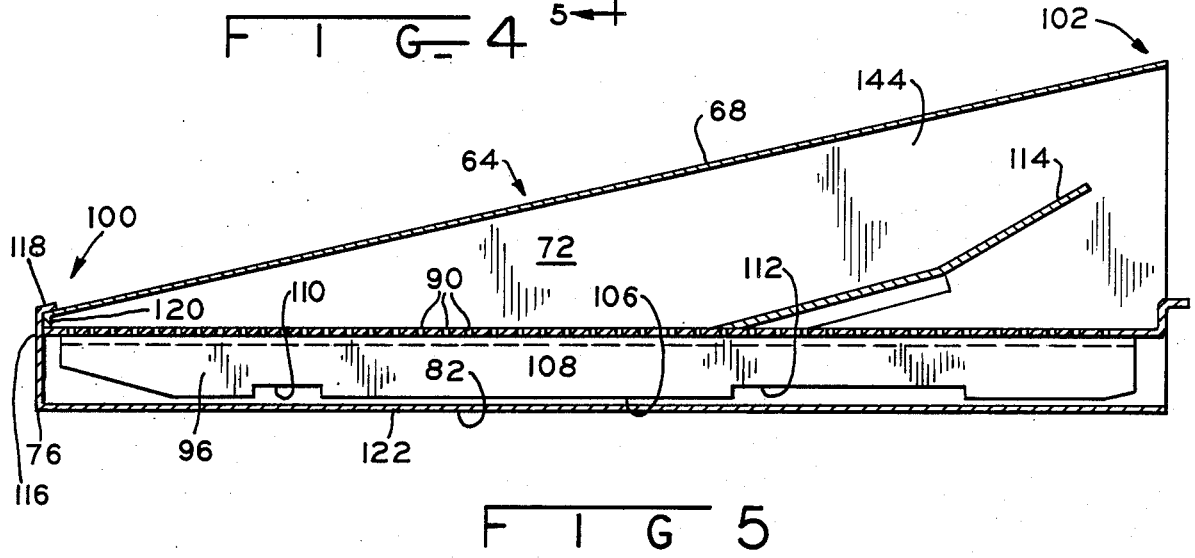
FIG. 5 is a sectional view of the duct finger and radiant panel of FIG. 3 taken along the line 5—5 of FIG. 4 and viewed in the direction of the arrows.

In addition to serving as air returns, upper return duct fingers 64 also provide radiant heating of the upper surface of food product 62. Referring to FIGS. 3, 4 and 5, there is illustrated an upper return duct finger 64 which is similar in structure to an embodiment of a duct finger shown in co-pending U.S. patent application Ser. No. 038,021, filed Apr. 14, 1987, owned by the same assignee. Unlike the duct finger of the aforementioned patent application, duct finger 64 acts as an air return duct in the preferred embodiment, rather than as an air delivery duct. Each of the upper return duct fingers 64 includes a stainless steel main duct portion 66 including top 68 and generally triangular sides 70 which form a main duct chamber 72. The lower portion of each upper return duct finger 64 is bent into a generally L-shaped configuration forming flanges 74. Slidably connected to flanges 74 is an aluminum infra-red radiant panel 76 having sides 78 and flanges 80 within which flanges 74 of upper return lower duct finger 64 are received.

Radiant panel 76 has a lower surface 82 which faces downwardly, in the preferred embodiment, toward the food product support conveyor assembly 30. Radiant panel 76 is provided with a plurality of slots 84 which may be arranged in the pattern shown in FIG. 3 and which also face toward the food product support conveyor assembly 30. Slots 84 may be ⅜ inch in diameter and 3 inches long. Disposed within main duct chamber 72 is an insert plate assembly 86 including a U-shaped plate 88 having a plurality of apertures 90 as illustrated in FIG. 4. Spot welded or otherwise secured to plate 86 are a pair of L-shaped baffle plates 92 including horizontal portions 94 and vertical portions 96, the latter being spaced apart and forming a central panel 98 which tapers from the forward end 100 of insert plate assembly 86 toward the rearward end 102 thereof which attaches to plenum 50. The lower edges of portions 96 of baffle plates 92 are spaced away from the inner surface 104 of radiant panel 176 so as to form a pair of longitudinal gaps or slots 106 to permit air to flow from the secondary chambers 108 formed between the inner surface 104 of radiant panel 76 and insert plate assembly 86 to main duct chamber 72.

As illustrated in FIG. 5, vertical portions 96 of insert plate assembly 86 may be provided with notches 110 and 112 located at the forward and rearward portions of upper return duct finger 64 so as to increase the flow of heated air from secondary chambers 108 through central channel 98. Furthermore, a deflector 114 may be provided to adjust the flow of heated air from the forward and rearward portions of central channel 98. With further reference to FIG. 5 it can be seen that the forward end 116 of radiant panel 76 includes a lip 118 which fits around the forward end 120 of duct 64. As indicated earlier, duct 64, radiant panel 76 and insert plate assembly 86 are all slidably connected. This enables the parts to be disassembled for cleaning and also provided clearance between these parts which enables the stainless steel duct 66 to expand thermally at a different rate than aluminum radiant panel 76. Bottom wall 122 of radiant panel 76 is aluminum having a thickness of approximately 0.070 inches. The lower surface 82 and inner surface 104 of bottom wall 122 is hard coat anodized, resulting in black infra-red emissive surfaces. The anodized coating acts as a "black body" for good heat absorption and radiation. The anodized finish can consist of sulfuric anodized type III hard coat. The emissivity of the coating is such that with hot air at a temperature of about 500° F. heating bottom wall 122, heat is conducted to lower surface 82 and radiated at an effective infra-red temperature of 700° F.

As hot air is drawn into upper return duct finger 64 through slots 84 the heated air enters secondary chamber 108 and then flows laterally through gaps 106 and notches 110 and 112 formed between portions 96 of insert plate assembly 86 and the inner surface 104 of bottom wall 122. The hot air exits secondary chamber 108 via central channel 98 into apertures 90 and is returned to the intake of plenum 50 via main duct chamber 72 of upper return duct finger 64.

The heated air imparts heat to bottom wall 122 as it sweeps past inner surface 104. Since the bottom wall 122 of panel 76 is made of aluminum and is therefore a very good conductor of heat, the heat imparted to surface 104 is conducted through wall 122 and heats the lower surface 82 of bottom wall 122. Because the outer surface 92 is black in color and functions as a "black body", this heat is radiated toward food product 62 in the form of infra-red radiation.

Upper return duct fingers 64 are preferably spaced in vertical alignment with corresponding lower finger ducts 56, although a staggered or other arrangement of ducts 64 and 56 can be employed.

Referring in particular to FIG. 6, an enlarged cross-sectional view of a portion of the conveyor assembly 30 is illustrated to more clearly portray the relationship of the radiant plate 60 to the various portions of the conveyor assembly 30. Conveyor 30 includes a foraminous wire mesh continuous conveyor belt loop 126, with the upper loop portion 128 providing support for the food product. Since conveyor belt loop 126 is continuous there must be at any given time a lower loop portion 130 as well as an upper loop portion 128. Upper loop portion 128 rides on a plurality of longitudinally disposed support rods 132, each of which is approximately ¼ inch in diameter. Support rods 132 are themselves welded or otherwise attached to and supported by transverse support rods 134 which are attached to the side frames of conveyor assembly 30. Welded or otherwise attached to the bottom of transverse support rods 134 is a second plurality of longitudinally oriented support rods 136. Support rods 136 support plates 60 via transverse inverted U-channels 138 which are fixed to the bottom surface of plates 60 and rest upon the top of support rods 136. A third plurality of longitudinally oriented support rods 140 are welded to transverse support rods 142 which are attached to the side frames of conveyor assembly 30. Support rods 140 support lower loop portion 130 of conveyor belt 126.

The vertical dimensions of FIG. 6 have been exaggerated for clarity in order to show the support structure which provides for the closest possible placement of radiant plates 60 to the undersurface of the food product which is supported by upper loop portion 128 of conveyor belt loop 126. The structure disclosed allows the top infra-red emissive surface of plate 60 to be placed about ¼ inch below the lower surface of the food product and within the conveyor belt loop 126. Since the conveyor belt loop 126 is a foraminous open wire mesh, plate 60 can be readily heated from below by columnated hot air jets passing through lower loop portion 130 and impinging on the undersurface of plate 60. Likewise upper loop portion 128 is substantially transparent to infra-red radiation, thereby enabling the heat of the hot impinging air which is conducted through thermally conductive plate 60 to the upper surface thereof to be emitted therefrom as infra-red radiant energy and to be applied to the lower surface of the food product.

The location of the relatively thin radiant plate 60 within conveyor loop 126 while the bulkier heat source is located below conveyor assembly 30 allows the radiant upper surface of plate 60 to be in very close proximity to the bottom of the food product. This provides for efficient transmission of heat via infra-red radiation, since the intensity of infra-red radiation per unit area falls off in proportion to the square of the distance between the radiant surface and the food product. Consequently, the lower surface of the food product is cooked by substantially the same heating mode as in a hearth oven, but with the advantages and efficiencies of conveyorized operation and hot air impingement heat transfer.

Alternatively to the thin plate 60 shown in FIG. 6, the plate 60 can be constructed of thicker aluminum and the support brackets 138 eliminated. For example, plate 60 could comprise a ¼ inch thick aluminum hard coat anodized plate supported directly on support rods 136.

While this invention has been described with reference to a preferred embodiment, it will be understood that it is capable of further modification. This application is therefore intended to cover any variations, uses or adaptations of the invention following the general principles thereof and including such departures from the present disclosure as come within known or customary practice in the art to which this invention pertains and fall within the limits of the appended claims.

What is claimed is:

1. A food preparation oven, comprising:
   an enclosure defining a chamber for receiving a food product therein;
   support means for supporting a food product in said chamber;
   air recirculating means, including an inlet, for recirculating a mass of air within said chamber;
   heating means for heating the recirculating air within said chamber; and
   a return duct in flow communication with the inlet of said recirculating means, said return duct including a wall disposed above and generally parallel to said support means, the wall having an outer radiant energy emissive surface means for radiating infra-red energy towards said support means when said wall is heated, said return duct further including means for heating said wall by communicating heated air from said chamber into said return duct.

2. The food preparation oven of claim 1, in which said means for heating said wall includes a plurality of apertures through said wall.

3. The food preparation oven of claim 2, in which the wall of said return duct includes an inner surface, and said means for heating said wall includes means for causing the heated air to change direction within said return duct after the heated air is communicated into said return duct, such that the heated air flows in a direction generally perpendicular to said plurality of apertures just after flowing through said apertures.

4. The food preparation oven of claim 1, in which the wall of said return duct includes an inner surface, and said means for heating said wall includes baffle means for causing heated air to sweep past the inner surface to thereby impart heat to the inner wall.

5. The food preparation oven of claim 1, wherein said support means includes a conveyor traveling through said chamber in a first direction and said return duct is generally elongate and extends in a direction generally perpendicular to a vertical plane coincident with the direction of travel of said conveyor.

6. The food preparation oven of claim 1, in which said air circulating means includes a plenum having an inlet and an outlet and fan means for pressurizing heated air in said plenum such that the outlet is at a higher pressure than the inlet.

7. A food preparation oven, comprising:
   an enclosure defining a chamber for receiving a product therein;

support means for supporting a food product in said chamber, said support means being at least partially transparent to infra-red radiation, said support means including a foraminous conveyor belt loop having an upper loop portion configured for supporting said food product and a lower loop portion disposed below said plate;

air recirculating means, including an inlet and an outlet, for recirculating a mass of air within said chamber;

heating means for heating the recirculating air within said chamber;

a plate supported in said chamber adjacent and below said support means, said plate having an upper radiant energy emissive surface means for radiating infra-red energy toward said support means when said plate is heated; and heating means for heating said plate, said heating means including an outlet duct disposed below and in close proximity to said plate in flow communication with the outlet of said air recirculating means, said outlet duct including means for directing columnated jets of heated air against said plate, said means for directing columnated jets being disposed below the lower loop portion.

8. The food preparation oven of claim 7, in which the means for directing heated air against said plate includes an outer nozzle plate having a plurality of apertures therethrough and a corresponding inner nozzle plate spaced apart from said outer nozzle plate and having a like number of apertures aligned with the apertures of said outer nozzle plate.

9. The food preparation oven of claim 7, in which the means for directing heated air against said plate includes an outer nozzle plate having a plurality of apertures therethrough and a corresponding inner nozzle plate spaced apart from said outer nozzle plate and having a like number of apertures aligned with the apertures of said outer nozzle plate.

10. The food preparation oven of claim 9, in which said support means includes a cooking area, and said plate is substantially contiguous and covers substantially the full length and width of the cooking area of the conveyor belt,loop.

11. The food preparation oven of claim 10, in which said plate is a highly thermally conductive aluminum sheet, the surfaces of which are hard coat anodized and are of a black color capable of efficient collection and emission of infra-red radiation.

12. The food preparation oven of claim 10 in which said plate is a semi-thermally conductive material with high radiative characteristics and capable of efficient collection and emission of infra-red radiation.

13. The food preparation oven of claim 7, further including a conveyor support structure having a first plurality of longitudinally disposed support rods upon which the upper loop portion rides, a second plurality of longitudinally disposed support rods located below the first plurality of support rods, said second plurality of second support rods supporting said plate thereupon.

14. The food preparation oven of claim 13, in which the conveyor belt loop support structure includes a third plurality of longitudinally disposed support rods located below said plate upon which the lower loop portion rides.

15. A food preparation oven, comprising:

an enclosure defining a chamber for receiving a food product therein;

support means for supporting food product in said chamber, said support means being at least partially transparent to infra-red radiation;

air recirculating means, including an intake and an outlet, for recirculating a mass of air within said chamber;

heating means for heating air within said chamber;

a plate supported in said chamber adjacent and below said support means, said plate having an upper radiant energy emissive surface means for radiating infra-red energy toward said support means when said plate is heated;

heating means for heating said plate, said heating means including an outlet duct disposed below said plate in flow communication with the outlet of said air recirculating means, said outlet duct including means for directing columnated jets of heated air against said plate; and a return duct in flow communication with the intake of said air recirculating means, said return duct including a wall disposed above and generally parallel to said support means, the wall having an outer radiant energy emissive surface means for radiating infra-red energy toward said support means when said wall is heated, said return duct further including means for heating said wall by communicating heated air from said chamber into said return duct.

16. The food preparation oven of claim 15, in which said support means includes a foraminous conveyor belt loop having an upper loop portion configured for supporting said food product and a lower loop portion disposed below said plate, and in which the means for directing columnated jets of heated air against said plate is disposed below the lower loop portion.

* * * * *